UNITED STATES PATENT OFFICE.

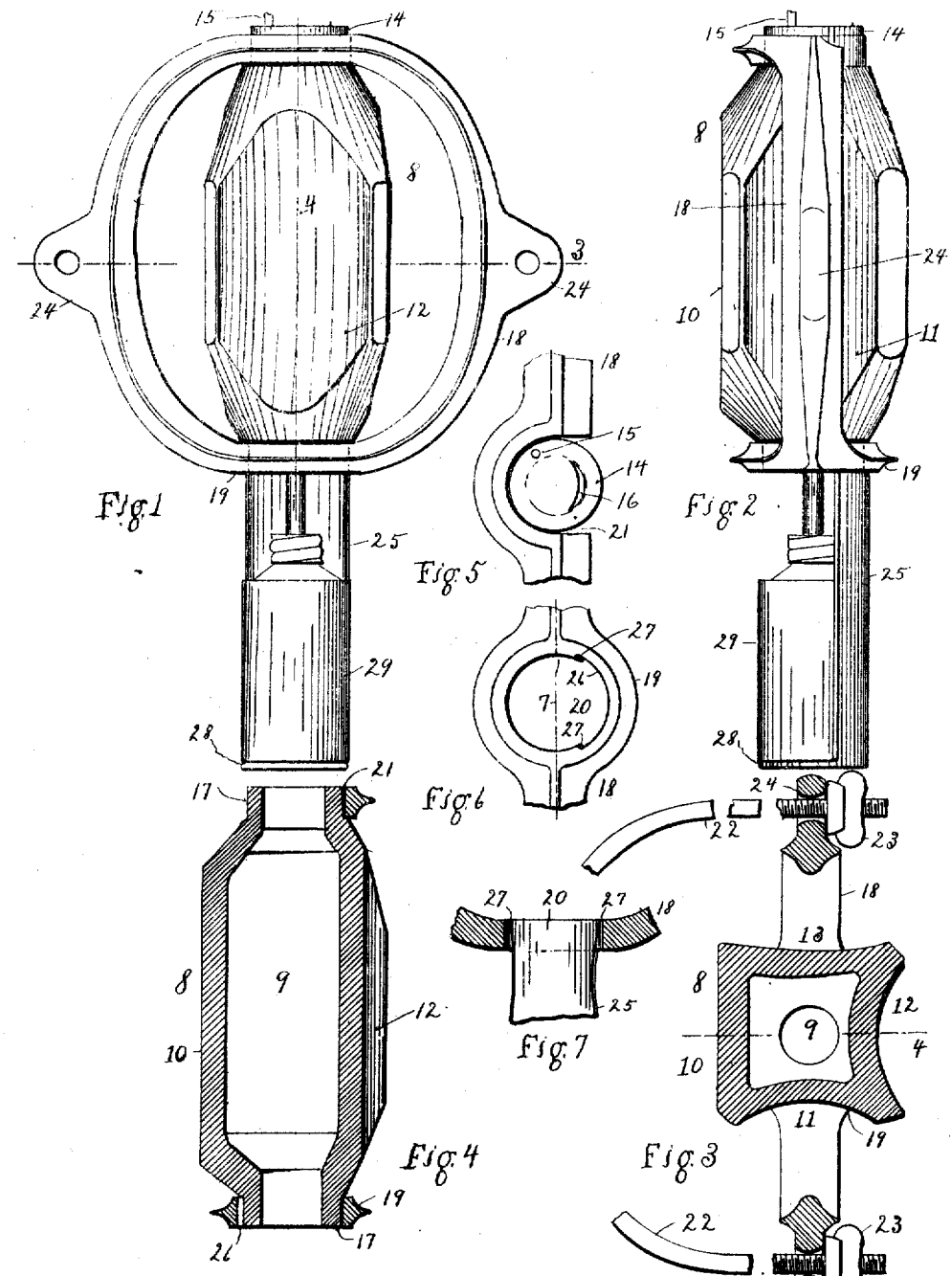

JAMES M. PADGETT, OF TOPEKA, KANSAS.

RUBBER-TIRE REPAIRER.

No. 913,043.　　　Specification of Letters Patent.　　　Patented Feb. 23, 1909.

Application filed January 14, 1908. Serial No. 410,716.

*To all whom it may concern:*

Be it known that I, JAMES M. PADGETT, a citizen of the United States, residing in Topeka, in the county of Shawnee and State of Kansas, have invented a new and useful Improvement in Rubber-Tire Repairers, of which the following is a specification.

My invention relates to vulcanizing devices used for repairing the rubber tires of automobiles, bicycles, and the like, the type herein shown being especially designed as a portable device for use on automobile tires, and being also adapted to such work without removing the tire from the wheel or the wheel from the vehicle, so that repairs can readily be made on the road-side.

The object of my invention is to improve generally upon devices of this character, to provide a vulcanizer which will accomplish a wider range of work than any heretofore constructed, to provide a vulcanizer with three or more integral faces of different contour, to provide a means for securing uniform pressure on all parts of the vulcanizer face, to provide a vulcanizer with a plurality of faces and a suitable means for turning any desired face to the work, to provide a portable vulcanizer body with a plurality of faces to fit against the work and a swiveled yoke whereby any one of said faces may be made to fit against the tire, to provide in such a device a means especially adapted for repairing cuts on the sides of the tire and near the rim, and to provide the various devices hereinafter more fully set forth. And my invention consists of the parts, improvements, and combinations herein pointed out and claimed.

In the drawings accompanying and forming part of this specification and in the description thereof, I have shown my invention in its preferred form and have shown the best mode of applying the principles thereof; but it is to be understood that I contemplate changes in form, proportions, and materials, the transposition of parts, and the substitution of equivalent members, within the scope of the appended claims, without departing from the spirit of the invention.

Figure 1 is a view of a vulcanizer made in accordance with my invention having four faces of different contour, this view being from the side opposite to that on which the work is located, and the flat face being turned toward the work. Fig. 2 is a side view of the same device, the kidney-shaped face being adapted to be applied to the work. Fig. 3 is a horizontal sectional view on a plane through the line 3 of Fig. 1, showing also broken portions of the binding yoke. Fig. 4 is a vertical sectional view through the line 4 of Figs. 1 and 3. Fig. 5 is a plan view of the top portion of the swiveled yoke, showing also the damper for the vulcanizer body. Fig. 6 is a plan view of the lower portion of the swiveled yoke. Fig. 7 is a sectional view of the same portion, through line 7 of Fig. 6, showing the manner of securing the lamp support and protecting shield thereto.

Similar reference characters indicate like or corresponding parts throughout the several views.

8 is a suitable vulcanizer body having a plurality of faces, preferably four in number, formed to fit against the work. The body has an opening or chamber therein, 9, for the reception of any suitable heating medium, such as a gasolene lamp burner, a gas burner, an alcohol burner, an electric heater, or the like. The faces may be of any desired shapes, but in adapting my vulcanizer for use on automobile tires and the like, I prefer to form the body with a flat face 10 for the repair of the inner tube (which of course must be removed and may be pressed against any flat surface), a curved face 11 of a small radius for the repair of the smaller tires, a curved face 13 of larger radius for the repair of the larger tires, and a kidney-shaped face 12 for the repair of the sides of the tire and adapted to conform to the longitudinal curvature of the tire as well as to the cross-sectional curvature.

At the top I provide a damper 14, which may be pivoted thereon by means of the thermometer 15, which is set down in a hole in the body of the vulcanizer and which is used for indicating the temperature of the body; the damper being provided with a crescent-shaped port 16 in line with the inner edge of the chamber 9, the object being that the opening through the damper may be diminished or increased, to regulate the heat, the crescent shape permitting the opening to be closed entirely without uncovering the heat chamber at the opposite side of the damper.

The ends of the vulcanizer are preferably reduced and terminate in round journals 17, 17, suitable for swiveling to the yoke 18, in the lower part of which, 19, is a circular opening 20, and in the upper part of which is a semi-circular opening 21, which arrangement of openings or bearings permit the vulcanizer body to be easily inserted into and removed from the yoke. The vulcanizer body and yoke may be secured in place with the desired face against the work by means of the binding yoke 22 and thumb-nuts 23, 23, which engage the perforated ears 24, 24 of the yoke 18. In the instance of repairing vehicle tires on the wheel, the yoke 22 is adapted to pass around the felly, and the vulcanizer body may then be firmly pressed against the tire by means of the thumb-nuts 23, 23.

25 is a combined lamp support and protecting shield supported from the lower part of the device, as in the opening 26 in the lower bearing, the edges of the opening 26 being wedge-shaped 27, 27. The support may be provided with a step 28, on which to set a lamp 29 for heating the vulcanizer body. The part of the work below the body will be protected from the heat by the shield 25, a feature especially desirable when an electric heater is used and the heat regulated by slipping the heater inwardly or outwardly, instead of regulating by means of a rheostat.

To operate my invention, the cut or damaged spot is cleaned and otherwise prepared in the usual way. Then that face of the vulcanizer body which is best suited to fit against the work at the particular spot is selected and turned in the swivel yoke so as to conform to the repair. The binding yoke is then applied and the vulcanizer drawn up snug against the work by the thumb-nuts, as above indicated. A suitable heater is then applied to the body of the vulcanizer and the temperature of said body raised to 250 or 275 degrees Fahrenheit, when the heating device is regulated to hold this heat until the repair is completed.

The swiveled yoke permits the use of a vulcanizer body having three or more integral faces, thus giving a wide range of utility; it also insures a uniform repair as it prevents one edge of the face being drawn tighter against the work than the other edge, the swivel permitting the body to yield to the point of the greater pressure, and similarly it prevents the binding yoke from scratching the finish of the felly. This last-named feature is especially desirable in repairing cuts on the sides of the tire, and to further this especial utility, I provide the kidney-shaped face. The body may be turned with either end up to apply this face to either side, a hole being made for the thermometer in each end, and each end being adapted to receive the heating device.

What I claim is:

1. The combination of a hollow vulcanizer body formed with a plurality of faces of different contour to fit against the work, a yoke swiveled to said body, and a binding yoke secured to said swiveled yoke.

2. The combination of a hollow vulcanizer body formed with a plurality of faces to fit against the work, a yoke swiveled to said body, and a binding yoke having threaded ends and thumb-nuts engaging said swiveled yoke.

3. An apparatus of the character described comprising the combination of a hollow body having a plurality of faces of different contour to fit against the work, said body terminating at each end in a substantially circular journal, a yoke having a substantially circular bearing and a substantially semi-circular bearing whereby said yoke may be swiveled to said body at said respective ends, oppositely disposed perforated ears on said yoke, a binding yoke and thumb-nuts to engage said perforated ears, and suitable heating means insertible into said hollow body.

4. The combination of a vulcanizer body formed with a heat chamber and a plurality of faces of different contours to fit against the work, a yoke swiveled to said body, and a binding device secured to said swiveled yoke.

In testimony whereof I have hereunto signed my name in the presence of subscribing witnesses.

JAMES M. PADGETT.

Witnesses:
JOHN A. HULIT,
W. F. SCHOCH.